United States Patent [19]

Legrand

[11] Patent Number: 4,686,908
[45] Date of Patent: Aug. 18, 1987

[54] PUBLIC TRANSPORT VEHICLE

[76] Inventor: Pierre Legrand, 98 Rue de Reunes, 75006 Paris, France

[21] Appl. No.: 747,129
[22] PCT Filed: Nov. 16, 1984
[86] PCT No.: PCT/FR84/00265
 § 371 Date: Jun. 18, 1985
 § 102(e) Date: Jun. 18, 1985
[87] PCT Pub. No.: WO85/02153
 PCT Pub. Date: May 23, 1985

[30] Foreign Application Priority Data

Nov. 17, 1983 [FR] France .................. 83 18271

[51] Int. Cl.[4] .................. B61D 1/02; B60N 1/00
[52] U.S. Cl. .................. 105/315; 105/316; 105/325; 105/326; 105/345; 5/9 R; 244/118.6; 296/64; 297/162
[58] Field of Search .......... 105/314, 315, 316, 325, 105/326, 329 R, 344, 345; 244/118.5, 118.6; 296/64; 5/118, 9 R, 9 B; 297/145, 162

[56] References Cited

U.S. PATENT DOCUMENTS

| | | | |
|---|---|---|---|
| 468,493 | 2/1892 | Charles | 105/326 |
| 2,545,523 | 3/1951 | Loewy | 105/315 |
| 2,844,109 | 7/1958 | Austgen et al. | 105/315 X |
| 2,891,488 | 6/1959 | Haman | 105/345 |
| 3,632,161 | 1/1972 | Arfaras et al. | 297/145 |
| 3,784,989 | 1/1974 | Legrand | 105/316 X |
| 4,138,949 | 2/1979 | Gutridge et al. | 105/315 |

FOREIGN PATENT DOCUMENTS

| | | |
|---|---|---|
| 562934 | 12/1957 | Belgium . |
| 36822 | 9/1981 | European Pat. Off. .......... 5/9 R |
| 714911 | 12/1941 | Fed. Rep. of Germany ...... 105/345 |
| 2723148 | 11/1978 | Fed. Rep. of Germany ...... 297/162 |
| 715114 | 9/1954 | United Kingdom ............. 244/118.6 |

OTHER PUBLICATIONS

WO80/01156, *Arrangement for Vehicles*, published Jun. 12, 1980, Legrand.

*Primary Examiner*—Randolph A. Reese
*Attorney, Agent, or Firm*—Oblon, Fisher, Spivak, McClelland & Maier

[57] ABSTRACT

Equipment for public transport vehicles and transit areas having on either side of a longitudinal passageway, symmetrical transverse rows of sitting seats, having an alternating orientation, sometimes facing and sometimes back to back. At least above two longitudinal sequences of sitting seats on the side of the longitudinal passageway are provided longitudinal lounger seats, at a rate of one lounger for two sitting seats, whereof the central bottom points bear on the seat backs coupled back to back and whereof the adjacent raised ends are extended on the curved inner roof area. Access to each central bottom point takes place by steps located on the other side of the longitudinal passageway and which face one another, in the sides common to the seat backs joined back to back.

8 Claims, 6 Drawing Figures

PUBLIC TRANSPORT VEHICLE

BACKGROUND OF THE INVENTION

The present invention relates to equipment for air, sea, road and rail public transport vehicles and to transit areas.

All the relative or absolute figures given hereinafter are of an approximate nature and can vary as a function of the enclosed area, hereinafter referred to as the cabin, as well as the degree of luxury. In addition, for reasons of clarity, the seats for sitting have planar faces. The luxury of an individual choice between a sitting position in companionship and a stretched out position in isolation has only been an unprofitable dream.

SUMMARY OF THE INVENTION

The present invention provides the means for ensuring profitability. The choice is based on conventional sitting-type seats, which are located on the ground and in optimum four-person compartments, and extended seats or loungers, which are placed above the sitting seats. The profitability is based on the following gains. (1) Gain of between 13 and 25% or even more in the total number of sitting, plus lounger seats, compared with the conventional ground level filling of the same cabin. (2) Gain of a volume of between 80 and 200% in the individual stowing of baggage, compared with conventional stowing arrangements. (3) Gain in security of baggage, which are in the immediate vicinity of the owner, those on the ground being padlockable (4) Improvement in the efficiency of a better channelled air conditioning air. (5) Better balancing of the traffic flow, persons being attracted to the off-peak services when there is a better choice of positions. The absence of any overcrowding sensation is explained by the fact that the invention recovers 30% of the volume of the cabin which was previously unused, namely at the top under the curved roof area and on the ground below the sitting seats.

The invention is based on the following. As a result of gravity, any person rising from a sitting seat follows a square pattern with his head in a single direction. Thus, before rising, the head and bust must pivot forwards around the hips in order to bring the center of gravity of the body vertical with respect to the feet, so as to then be able to rise vertically by 40 cm, i.e. the length of the femur which passes from the horizontal to the vertical. This takes place in the reverse order for sitting down. Thus, e.g. in the case of a vehicle provided with rows of transverse sitting seats on either side of a longitudinal passageway or corridor, the front face of the space used by the occupants of these sitting seats is not a horizontal plane, but an undulating cylindrical surface with transverse undulations with a vertical amplitude equal to the 40 cm femur, which corresponds to the height difference between a sitting occupant and a standing occupant. This orientation can only be used above the rows of sitting seats having an alternating successive orientation, because it is then continuous and of considerable length in the same way as the profile of a lounger with a central bottom point and with raised ends at the head and feet. Access to the central bottom point takes place by means of steps positioned facing the edge of the passageway between the back to back seat backs.

This supplementary level of loungers eliminates the conventionally used racks for stowing the baggage of the occupants of the sitting seats. However, through the alternately oriented rows, under each pair of back to back sitting seats is formed two individual baggage stowing zones with a much larger volume than that conventionally allocated with sitting seats. This is for two reasons, namely, for equal ease, the spacing of the alternately oriented sitting seats exceeds by 10% the double single spacing of sitting seats in the same direction and each stowing zone is extended beneath the vertical of the seat back, which would be impossible with the seats in the same direction. Access to each stowing zone on the ground is obtained by raising the horizontal part of the seat. However, this prevents the use of a collapsible median tray for the facing seats. This is however replaced by individual trays which can be half-folded out so that the facing occupant can manipulate his luggage. As such a tray is heavy and difficult to rotate, it is advantageously subdivided into a left-hand and a right-hand symmetrical half.

BRIEF DESCRIPTION OF THE DRAWINGS

The invention is described in greater detail hereinafter relative to non-limitative embodiments and the attached drawings, wherein show.

DETAILED DESCRIPTION OF THE INVENTION

Figure 1:
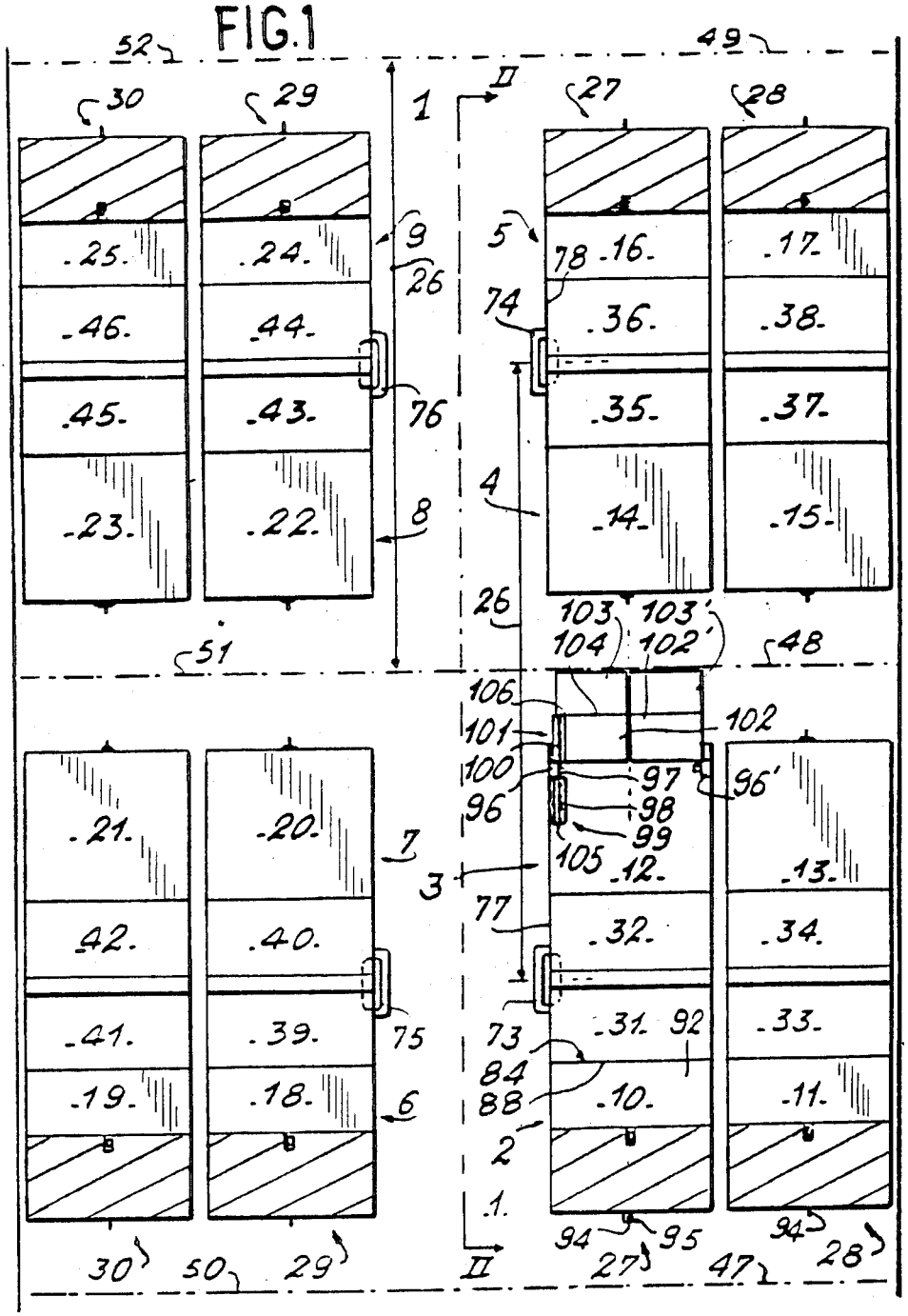
FIG. 1 a ground plan view of a cabin according to the invention.
Figure 2:
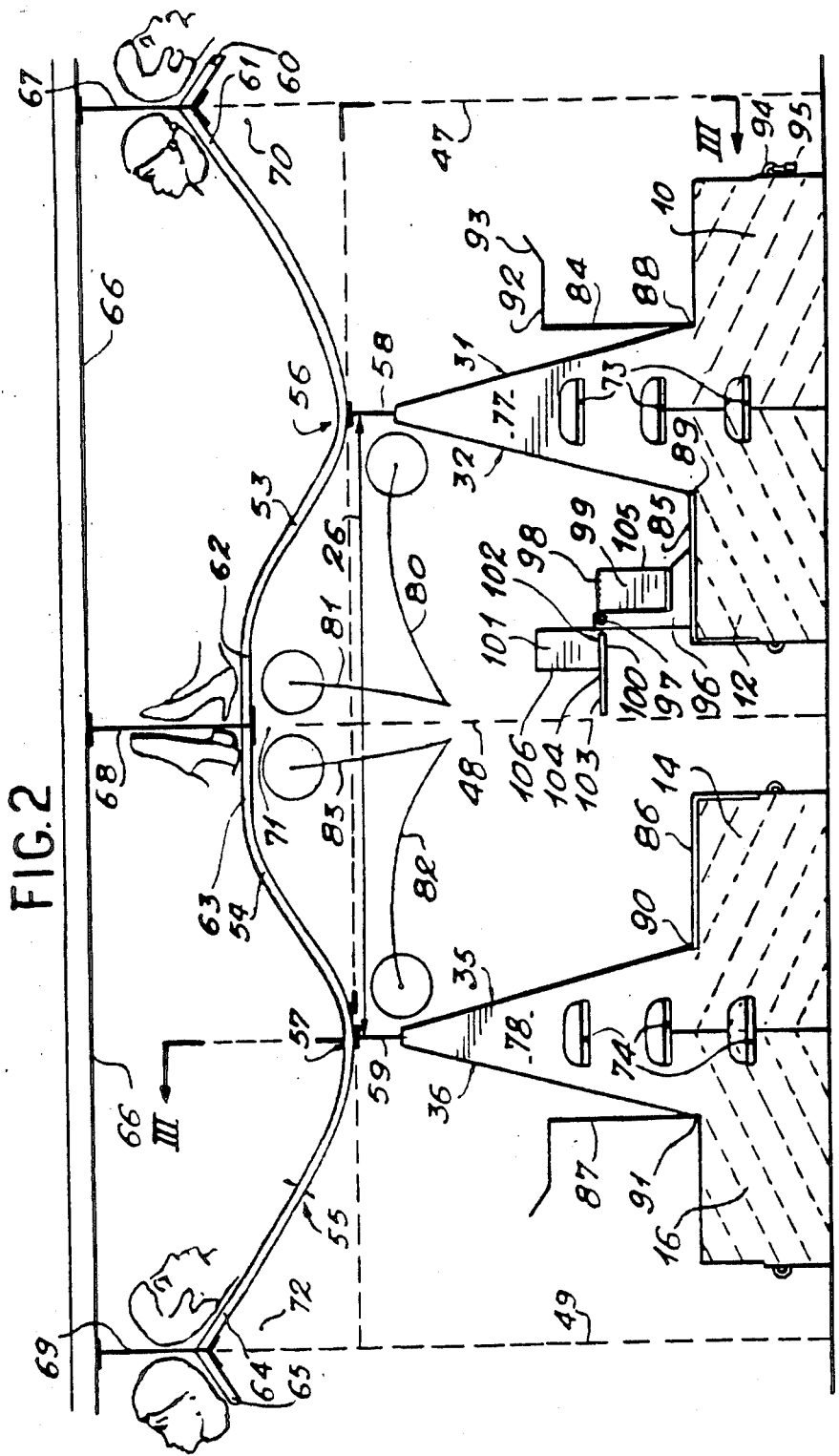
FIG. 2 a longitudinal section in elevation of FIG. 1 with a lounger level
Figure 3:
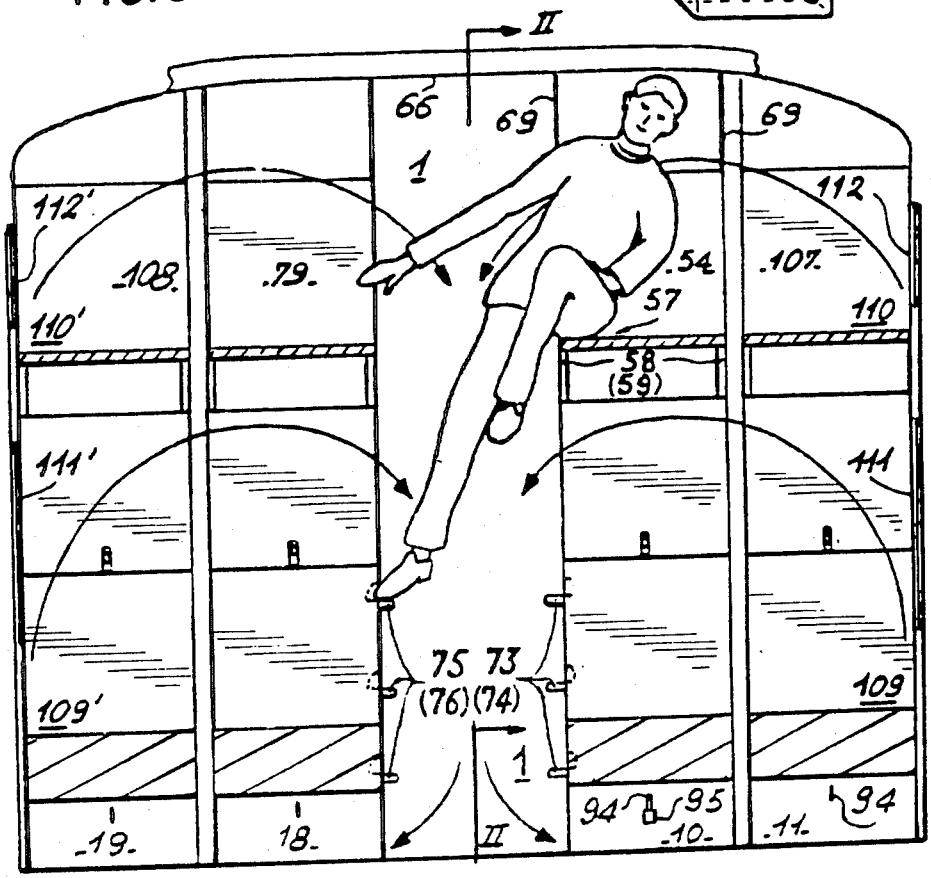
FIG. 3 a cross-section in elevation of FIG. 2.

With reference to FIGS. 1 to 3, the invention relates to cabins having at least one main or longitudinal passageway 1 of width 50 cm, on either side of which are placed on the ground and in symmetrical manner successive transverse rows 2, 3, 4, 5 and 6, 7, 8, 9 of identical sitting seats, which are most advantageously in pairs 10-11, 12-13, 14-15, 16-17 and 18-19, 20-21, 22-23, 24-25, said rows having an alternating back-to-back orientation and with a double spacing 26 of 185 cm in accordance with an irregular pattern of squares having longitudinal sequences 27, 28 and 29, 30 along which said successive sitting seats are either back to back 10-12, 11-13, 14-16, 15-17, and 18-20, 19-21, 22-24, 23-25, with coupled seatbacks 31-32, 33-343, 35-36, 37-38 and 39-40, 41-42, 43-44, 45-46 or face to face 12-14, 13-15 and 20-22, 21-23 spaced by transverse secondary passageways 47, 48, 49 and 50, 51, 52 or 45 cm. According to a first feature of the invention, at least above two longitudinal sequences 27 and 29 of sitting seats and at the edge of passageway 1 are provided identical, longitudinal, successive elevated loungers 53, 54 in FIG. 2, which have an alternating orientation, at a rate of one lounger per two sitting seats and whereof the thin profiles 55 of thickness 3 cm are undulated lengthwise and positioned heightwise and lengthwise, so that their central low points 56, 57 at a height of 140 cm, bear by means of supports 58, 59 on the said seatbacks 31-32, 35-36, which are coupled back to back, while their end to end raised adjacent end portions 60-61, 62-63, 64-65 are suspended on the inner curved roof part 66 by means of tie bolts 67, 68, 69 and constitute the high points 70, 71, 72 of the successive secondary passageways 47, 48, 49 of height 180 cm, taller passengers having to briefly lower their heads there. These tie bolts can be telescopic so that they can engage against the curved roof area with the loungers waiting. There is also a not shown horizontal strap, which is retractable by lowering during access alongside the loungers.

FIGS. 1, 2 and 3 show steps 73, 74 and 75, 76 placed on either side of the passageway 1 on median vertical parts of sides 77, 78 common to each pair of seats 10-12, 14-16 joined back to back enabling a passenger to sit back to the central low point 67 of lounger 54 on the right-hand side of passageway 1 and get up by means of the steps 76 on the left-hand side. The figure in FIG. 3 is in the process of turning over into lounger 54.

Symmetrically, access to lounger 79 on the left-hand side of passageway 1 takes place by means of the facing steps 74 on the right-hand side.

The passenger getting up from the sitting seat 12 in FIG. 2 cannot strike against the lounger 53 above him, because the head, indicated by a circle, firstly describes a substantially horizontal circular arc 80 about the hips and then rises substantially vertically according to 81. For sitting down, the trajectory is reversed. The trajectories of the head are the symmetrical lines 82 and 83 for seat 14 located below lounger 54.

According to a second feature in FIGS. 1 and 2, the horizontal seat portion 84, 85, 86, 87 of each sitting seat 10, 12, 14, 16 pivots around a transverse hinge 88, 89, 90, 91 located on its rear portion, so as to be able to open or close the individual ground luggage compartments which, as indicated by the dotted lines in FIG. 2, extend beneath the back 31 for seat 10, which would be impossible in the case of sitting seats in the same direction one behind the other.

Horizontal seat portions 84, 87 are raised and 85, 86 are lowered. Each horizontal seat portion 84 has a perpendicular, wide "dropped edge" 92, which to the same extent uncovers the front of the compartment and facilitates baggage handling. These compartments have a depth of 60 cm, a width of 45 cm, and a height of 35 cm, being provided with simple closure means. For example, the horizontal seat portion 84-92 carries an articulated tongue 93 with a slot folding on to a half-ring 94 fixed to the front of the closable compartment by not shown clips and a personal padlock 95.

Figure 4:
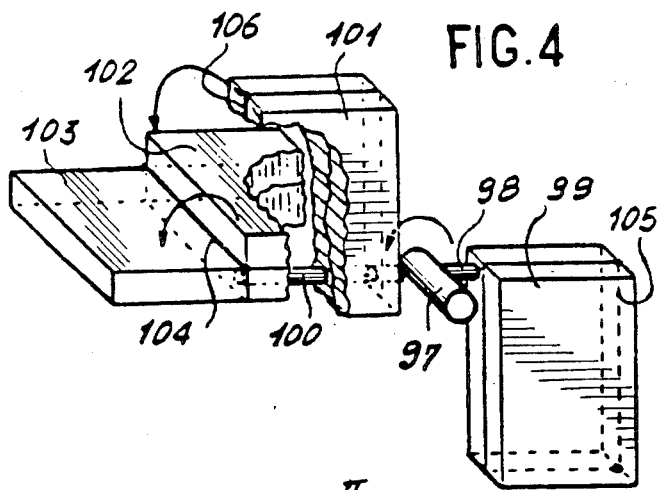
FIG. 4 a detail of an individual foldable tray.

According to a third feature, each sitting seat 12 in FIGS. 1, 2 and 4 is provided with an individual foldable tray, which is subdivided into two symmetrical halves to the left and right. For example, the left leg 96 of seat 12 carries a first fixed, transverse pivot pin 97 about which can pivot by 180° a second rear, longitudinal, perpendicular pivot pin 98, carrying the bottom, vertical, left-hand half-tray 99 formed from two elements folded in dihedron form after pivoting the pin 98 by 180° longitudinally forwards and so moving the half-tray vertically upwards to position 101, the halftray may be folded down by 90° transversely about pin 100 to the horizontal position 102 after which, the upper element of the dihedron is folded by 180° towards the front at 103 about the third pivot pin 104, which can also be seen at 105, 106 in the preceding positions 99, 101. Not shown abutments limit the rotations. Symmetrically the right leg 96' in FIG. 1 carries two opened-out elements 102' and 103'. This subdividing into two halves permits easier rotations by means of less robuts equipment, which permits the half-folding out of each half-tray, so as not to hinder handling of facing luggage.

According to a fourth feature, each lounger 54, 79 in FIG. 3 on the edge of passageway 1 is extended transversely by a surface 107, 108 with the same aforementioned undulating profile, which is used for the large-scale individual stowing of luggage in the immediate vicinity and is particularly advantageous for large back packs. Further features will be described hereinafter.

On either side of passageway 1 and up to the side of the cabin, the lounger stage constitutes a tight contiguous layer 54-107, 79-108, cf. FIG. 3, which in accordance with the arrows channels the recycled conditioned air through the lateral openings or nozzles 109, 110 and 109', 110'.

Figure 5:
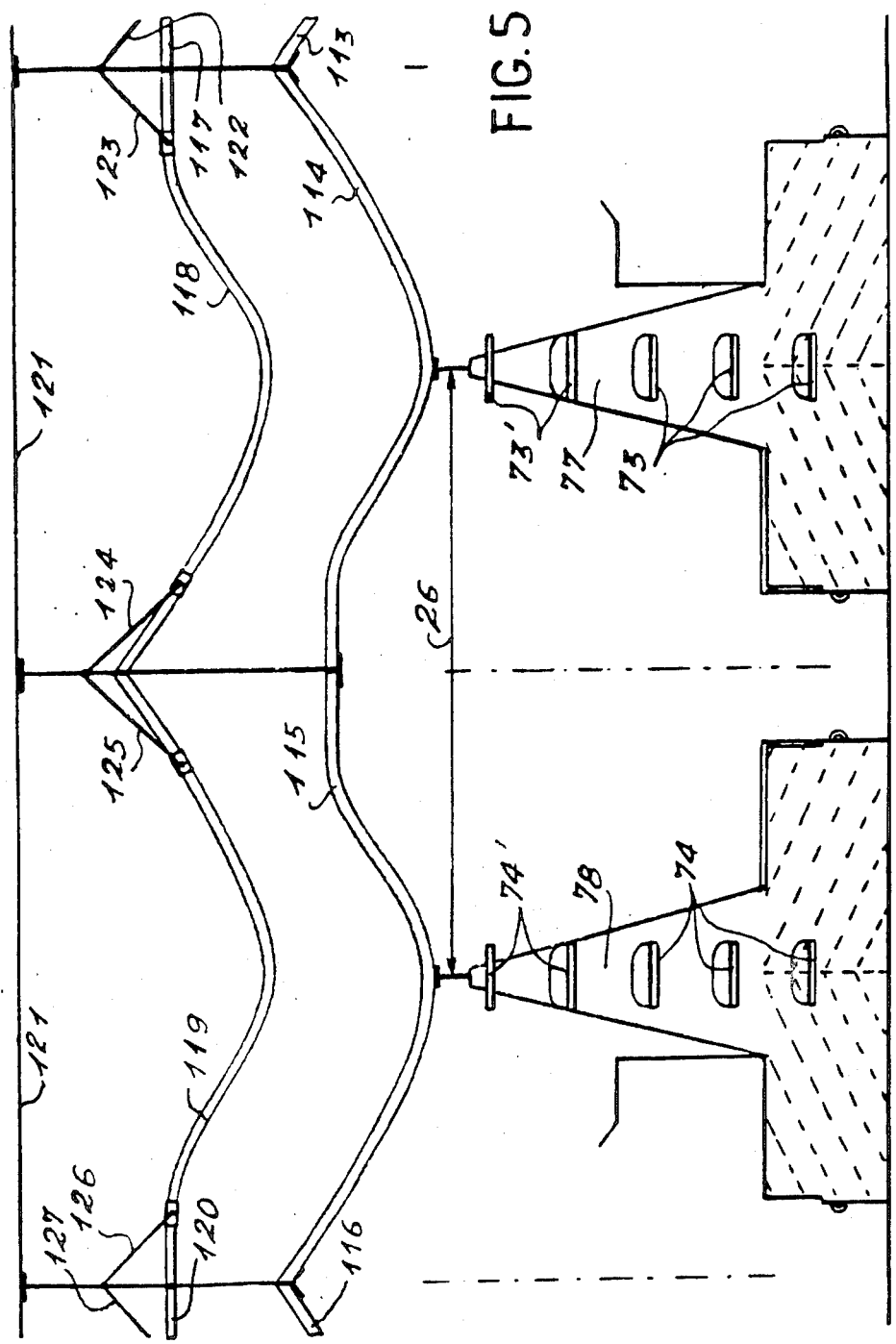
FIG. 5 a variant of FIG. 2 with two lounger levels.

A good view to the outside is provided by windows 111, 111' in accordance with safety standards for the sitting level, as well as smaller windows 112, 112' for the lounger level. In FIG. 5, the lounger stage 113, 114, 115, 116 is surmounted by a second lounger stage 117, 118, 119, 120, each 118 being above another 114, preferably 50 cm higher and heat to foot, the steps 73, 74, 75, 76 being extended by 50 cm at 73', 74'. This second lounger stage is entirely suspended on the inner curved roof 121 by means of tie bolts 122, 123-124, 125-1262, 127 which are oblique in order to relieve strain on the structures and spaced in order to maintain easy access to the loungers.

Figure 6:
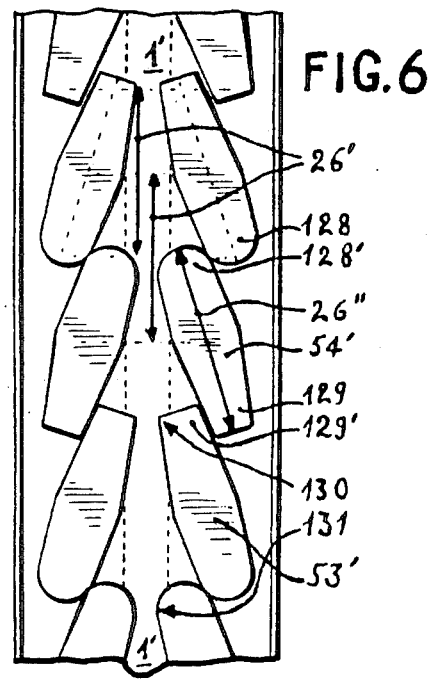
FIG. 6 a plan view variant of FIGS. 2 and 3 with oblique loungers.

In the case of rows of sitting seats e.g. with a double spacing 155 cm instead of 185 cm, the loungers remain longitudinal, while keeping their adjacent extremeties end to end, with an accentuated undulating profile and with the same installation spacing of 155 cm. However, as a variant in FIG. 6, all the loungers 53', 54' on each side can have the same obliqueness of 15° on passageway 1'. The juxtapositioning of head 128, 128' and foot 129, 129' makes it possible to retain a normal installation lounger length 26", which exceeds the double spacing 26' of the rows of sitting seats. The overlaps of the feet 130 and heads 131 of the loungers over the shoulders of passengers is not prejudicial.

What is claimed is:

1. In a public transport vehicle, a compartment comprising:
    at least one longitudinal main pasageway in said compartment;
    at least one row of sitting seats on each side of said at least one main passageway, each said row of sitting seats comprising a longitudinally extending series of longitudinally spaced pairs of back-to-back seats, whereby any of said sitting seats is coupled back-to-back with another sitting seat of said pair of seats having an orientation opposite thereto, and faces a secondary passageway separating said any of said seats from another seat of another of said pairs of seats having an orientation opposite thereto;
    at least one elevated lounger extending over each of said pairs of seats, each of said loungers being vertically undulated along the length thereof and positioned such that ends thereof are located over adjacent ones of said secondary passageways, wherein a longitudinal mid-portion of each of said loungers is lower than said ends thereof and is located over the seat backs of said pair of seats between said adjacent secondary passageways;
    tie bolt means for securing each of said ends of said loungers to a roof of said compartment;
    support means on said seat backs for supporting said mid-portions of said loungers; and a vertical array of steps on lateral sides of each said pair of seats for permitting a passenger to raise himself into said loungers.

2. The vehicle of claim 1, wherein each said seat has a horizontal seat portion hinged to said seat back whereby said seat portion can pivot between open and closed positions, and a luggage compartment below said seat portion, and wherein each said seat portion includes means for locking said seat portion in a closed position.

3. The vehicle of claim 2, wherein said means for locking comprises an articulated slotted tongue mounted on said seat portion and cooperating with a half-ring fittable through said slot.

4. The vehicle of one of claim 1, 2 or 3 including two symmetrical half trays for each said seat, each said half tray comprising:

a first transverse pin fixed to said seat;
a second longitudinal pivot pin pivotably mounted on said first pivot pin; and
a folded half-tray element pivoted on said second pivot pin.

5. The vehicle of claim 1 including an undulated laterally extending stowing surface for each said lounger.

6. The vehicle of claim 1 comprising a plurality of said loungers connected end-to-end, whereby said loungers form an air recyclng channel.

7. The vehicle of claim 1 comprising two verticaly spaced ones of said loungers over each of said pairs of seats.

8. The vehicle of claim 1, wherein said loungers are angled by 15 degrees with respect to said main passageway and are overlapped end-to-end.

* * * * *